(12) United States Patent
Nguyen

(10) Patent No.: US 10,421,010 B2
(45) Date of Patent: Sep. 24, 2019

(54) DETERMINATION OF ADVERTISEMENT BASED ON PLAYER PHYSIOLOGY

(71) Applicant: Nguyen Gaming LLC, Reno, NV (US)

(72) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 297 days.

(21) Appl. No.: 14/216,986

(22) Filed: Mar. 17, 2014

(65) Prior Publication Data

US 2014/0274388 A1 Sep. 18, 2014

Related U.S. Application Data

(60) Provisional application No. 61/789,332, filed on Mar. 15, 2013.

(51) Int. Cl.
*A63F 13/30* (2014.01)
*G07F 17/32* (2006.01)

(52) U.S. Cl.
CPC .......... *A63F 13/12* (2013.01); *G07F 17/323* (2013.01); *G07F 17/3206* (2013.01)

(58) Field of Classification Search
CPC .......... G07F 17/3206; G07F 17/3239; G07F 17/323; G07F 17/3209; A63F 13/213; A63F 13/06; A63F 13/12; G06F 3/17; G02B 27/0093
See application file for complete search history.

(56) References Cited

U.S. PATENT DOCUMENTS

| | | | |
|---|---|---|---|
| 2,033,638 A | 3/1936 | Koppl | |
| 2,062,923 A | 12/1936 | Nagy | |
| 4,741,539 A | 5/1988 | Sutton et al. | |
| 4,948,138 A | 8/1990 | Pease et al. | |
| 5,067,712 A | 11/1991 | Georgilas | |
| 5,429,361 A | 7/1995 | Raven et al. | |
| 5,489,103 A | 2/1996 | Okamoto | |
| 5,630,757 A | 5/1997 | Gagin | |
| 5,655,961 A | 8/1997 | Acres et al. | |
| 5,704,835 A | 1/1998 | Dietz, II | |
| 5,727,786 A | 3/1998 | Weingardt | |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Benston, Liz, "Harrahs Launches iPhone App; Caesars Bypasses Check-in," Las Vegas Sun, Las Vegas, NV. Jan. 8, 2010.

(Continued)

*Primary Examiner* — David Duffy
*Assistant Examiner* — Ankit B Doshi

(57) ABSTRACT

A method, apparatus, and system of selective advertising includes a gaming server to receive a request to play a game of chance from a gaming device, transmit gaming data to the gaming device, the gaming data associated with the requested game of chance, and receive player data, the player data associated with the player's eye movement, gestures, or change in state. The server may also be configured to analyze the player data, determine a context associated with the player data; and initiate an action based on the determined context.

20 Claims, 6 Drawing Sheets

(56) References Cited

U.S. PATENT DOCUMENTS

| | | | |
|---|---|---|---|
| 5,833,537 | A | 11/1998 | Barrie |
| 5,919,091 | A | 7/1999 | Bell et al. |
| 5,947,820 | A | 9/1999 | Morro et al. |
| 5,997,401 | A | 12/1999 | Crawford |
| 6,001,016 | A | 12/1999 | Walker et al. |
| 6,039,648 | A | 3/2000 | Guinn et al. |
| 6,059,289 | A | 5/2000 | Vancura |
| 6,089,977 | A | 7/2000 | Bennett |
| 6,095,920 | A | 8/2000 | Sudahiro |
| 6,110,041 | A | 8/2000 | Walker et al. |
| 6,142,872 | A | 11/2000 | Walker et al. |
| 6,146,273 | A | 11/2000 | Olsen |
| 6,165,071 | A | 12/2000 | Weiss |
| 6,231,445 | B1 | 5/2001 | Acres |
| 6,270,412 | B1 | 8/2001 | Crawford et al. |
| 6,290,600 | B1 | 9/2001 | Glasson |
| 6,293,866 | B1 | 9/2001 | Walker et al. |
| 6,353,390 | B1 | 3/2002 | Beri et al. |
| 6,364,768 | B1 | 4/2002 | Acres et al. |
| 6,404,884 | B1 | 6/2002 | Marwell et al. |
| 6,416,406 | B1 | 7/2002 | Duhamel |
| 6,416,409 | B1 | 7/2002 | Jordan |
| 6,443,452 | B1 | 9/2002 | Brune |
| 6,491,584 | B2 | 12/2002 | Graham et al. |
| 6,505,095 | B1 | 1/2003 | Kolls |
| 6,508,710 | B1 | 1/2003 | Paravia et al. |
| 6,561,900 | B1 | 5/2003 | Baerlocker et al. |
| 6,592,457 | B1 | 7/2003 | Frohm et al. |
| 6,612,574 | B1 | 9/2003 | Cole et al. |
| 6,620,046 | B2 | 9/2003 | Rowe |
| 6,641,477 | B1 | 11/2003 | Dietz, II |
| 6,645,078 | B1 | 11/2003 | Mattice |
| 6,719,630 | B1 | 4/2004 | Seelig et al. |
| 6,749,510 | B2 | 6/2004 | Globbi |
| 6,758,757 | B2 | 7/2004 | Luciano, Jr. et al. |
| 6,773,345 | B2 | 8/2004 | Walker et al. |
| 6,778,820 | B2 | 8/2004 | Tendler |
| 6,780,111 | B2 | 8/2004 | Cannon et al. |
| 6,799,032 | B2 | 9/2004 | McDonnell et al. |
| 6,800,027 | B2 | 10/2004 | Giobbi et al. |
| 6,804,763 | B1 | 10/2004 | Stockdale et al. |
| 6,811,486 | B1 | 11/2004 | Luciano, Jr. |
| 6,843,725 | B2 | 1/2005 | Nelson |
| 6,846,238 | B2 | 1/2005 | Wells |
| 6,848,995 | B1 | 2/2005 | Walker et al. |
| 6,852,029 | B2 | 2/2005 | Baltz et al. |
| 6,869,361 | B2 | 3/2005 | Sharpless et al. |
| 6,875,106 | B2 | 4/2005 | Weiss et al. |
| 6,884,170 | B2 | 4/2005 | Rowe |
| 6,884,172 | B2 | 4/2005 | Lloyd et al. |
| 6,902,484 | B2 | 6/2005 | Idaka |
| 6,908,390 | B2 | 6/2005 | Nguyen et al. |
| 6,913,532 | B2 | 7/2005 | Bearlocher et al. |
| 6,923,721 | B2 | 8/2005 | Luciano et al. |
| 6,935,958 | B2 | 8/2005 | Nelson |
| 6,949,022 | B1 | 9/2005 | Showers |
| 6,955,600 | B2 | 10/2005 | Glavich et al. |
| 6,971,956 | B2 | 12/2005 | Rowe et al. |
| 6,984,174 | B2 | 1/2006 | Cannon et al. |
| 6,997,803 | B2 | 2/2006 | LeMay et al. |
| 7,018,292 | B2 | 3/2006 | Tracy et al. |
| 7,032,115 | B2 | 4/2006 | Kashani |
| 7,033,276 | B2 | 4/2006 | Walker et al. |
| 7,035,626 | B1 | 4/2006 | Luciano |
| 7,037,195 | B2 | 5/2006 | Schneider et al. |
| 7,048,628 | B2 | 5/2006 | Schneider |
| 7,048,630 | B2 | 5/2006 | Berg et al. |
| 7,063,617 | B2 | 6/2006 | Brosnan et al. |
| 7,076,329 | B1 | 7/2006 | Kolls |
| 7,089,264 | B1 | 8/2006 | Guido et al. |
| 7,094,148 | B2 | 8/2006 | Bearlocher et al. |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,169,041 | B2 | 1/2007 | Tessmer et al. |
| 7,169,052 | B2 | 1/2007 | Beaulieu et al. |
| 7,175,523 | B2 | 2/2007 | Gilmore et al. |
| 7,181,228 | B2 | 2/2007 | Boesch |
| 7,182,690 | B2 | 2/2007 | Giobbi et al. |
| RE39,644 | E | 5/2007 | Alcorn et al. |
| 7,243,104 | B2 | 7/2007 | Bill |
| 7,247,098 | B1 | 7/2007 | Bradford et al. |
| 7,259,718 | B2 | 8/2007 | Patterson et al. |
| 7,275,989 | B2 | 10/2007 | Moody |
| 7,285,047 | B2 | 10/2007 | Gielb et al. |
| 7,311,608 | B1 | 12/2007 | Danieli |
| 7,314,408 | B2 | 1/2008 | Cannon et al. |
| 7,316,615 | B2 | 1/2008 | Soltys et al. |
| 7,316,619 | B2 | 1/2008 | Nelson |
| 7,318,775 | B2 | 1/2008 | Brosnan et al. |
| 7,326,116 | B2 | 2/2008 | O'Donovan et al. |
| 7,330,108 | B2 | 2/2008 | Thomas |
| 7,346,358 | B2 | 3/2008 | Wood et al. |
| 7,355,112 | B2 | 4/2008 | Laakso |
| 7,384,338 | B2 | 6/2008 | Rothschild et al. |
| 7,387,571 | B2 | 6/2008 | Walker et al. |
| 7,393,278 | B2 | 7/2008 | Gerson et al. |
| 7,396,990 | B2 | 7/2008 | Lu et al. |
| 7,415,426 | B2 | 8/2008 | Williams et al. |
| 7,425,177 | B2 | 9/2008 | Rodgers et al. |
| 7,427,234 | B2 | 9/2008 | Soltys et al. |
| 7,427,236 | B2 | 9/2008 | Kaminkow et al. |
| 7,427,708 | B2 | 9/2008 | Ohmura |
| 7,431,650 | B2 | 10/2008 | Kessman |
| 7,448,949 | B2 | 11/2008 | Kaminkow et al. |
| 7,500,913 | B2 | 3/2009 | Baerlocher |
| 7,510,474 | B2 | 3/2009 | Carter |
| 7,513,828 | B2 | 4/2009 | Nguyen et al. |
| 7,519,838 | B1 | 4/2009 | Suurballe |
| 7,559,838 | B2 | 7/2009 | Walker et al. |
| 7,563,167 | B2 | 7/2009 | Walker et al. |
| 7,572,183 | B2 | 8/2009 | Olivas et al. |
| 7,585,222 | B2 | 9/2009 | Muir |
| 7,602,298 | B2 | 10/2009 | Thomas |
| 7,607,174 | B1 | 10/2009 | Kashchenko et al. |
| 7,611,409 | B2 | 11/2009 | Muir et al. |
| 7,637,810 | B2 | 12/2009 | Amaitis et al. |
| 7,644,861 | B2 | 1/2010 | Alderucci et al. |
| 7,653,757 | B1 | 1/2010 | Fernald et al. |
| 7,693,306 | B2 | 4/2010 | Konami |
| 7,699,703 | B2 | 4/2010 | Muir |
| 7,722,453 | B2 | 5/2010 | Lark et al. |
| 7,758,423 | B2 | 7/2010 | Foster et al. |
| 7,771,271 | B2 | 8/2010 | Walker et al. |
| 7,780,529 | B2 | 8/2010 | Rowe et al. |
| 7,780,531 | B2 | 8/2010 | Englman et al. |
| 7,785,192 | B2 | 8/2010 | Canterbury et al. |
| 7,811,172 | B2 | 10/2010 | Asher et al. |
| 7,819,749 | B1 | 10/2010 | Fish |
| 7,822,688 | B2 | 10/2010 | Labron |
| 7,828,652 | B2 | 11/2010 | Nguyen et al. |
| 7,828,654 | B2 | 11/2010 | Carter |
| 7,828,661 | B1 | 11/2010 | Fish |
| 7,850,528 | B2 | 12/2010 | Wells |
| 7,874,919 | B2 | 1/2011 | Paulsen et al. |
| 7,877,798 | B2 | 1/2011 | Saunders et al. |
| 7,883,413 | B2 | 2/2011 | Paulsen |
| 7,892,097 | B2 | 2/2011 | Muir et al. |
| 7,909,692 | B2 | 3/2011 | Nguyen et al. |
| 7,909,699 | B2 | 3/2011 | Parrott et al. |
| 7,918,728 | B2 | 4/2011 | Nguyen et al. |
| 7,927,211 | B2 | 4/2011 | Rowe et al. |
| 7,927,212 | B2 | 4/2011 | Hedrick et al. |
| 7,951,008 | B2 | 5/2011 | Wolf et al. |
| 8,057,298 | B2 | 11/2011 | Nguyen et al. |
| 8,057,303 | B2 | 11/2011 | Rasmussen |
| 8,087,988 | B2 | 1/2012 | Nguyen et al. |
| 8,117,608 | B1 | 2/2012 | Slettehaugh |
| 8,133,113 | B2 | 3/2012 | Nguyen |
| 8,182,326 | B2 | 5/2012 | Speers et al. |
| 8,210,927 | B2 | 7/2012 | Hedrick |
| 8,221,245 | B2 | 7/2012 | Walker |
| 8,226,459 | B2 | 7/2012 | Barrett |

(56) References Cited

U.S. PATENT DOCUMENTS

| | | |
|---|---|---|
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Homik |
| 8,430,745 B2 | 4/2013 | Agarwal et al. |
| 8,461,958 B2 | 6/2013 | Saenz |
| 8,469,813 B2 | 6/2013 | Joshi |
| 8,529,345 B2 | 9/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,696,470 B2 | 4/2014 | Nguyen |
| 8,745,417 B2 | 6/2014 | Huang et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Chung |
| 9,486,704 B2 | 11/2016 | Chung |
| 9,576,425 B2 | 2/2017 | Nguyen |
| 9,626,826 B2 | 4/2017 | Nguyen |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0047291 A1 | 11/2001 | Garahi |
| 2002/0006822 A1 | 1/2002 | Krintzman |
| 2002/0042295 A1 | 4/2002 | Walker et al. |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0183105 A1 | 12/2002 | Cannon et al. |
| 2003/0001338 A1 | 1/2003 | Bennett et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0103965 A1 | 6/2003 | Jung et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082385 A1 | 4/2004 | Silva et al. |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0147308 A1 | 7/2004 | Walker et al. |
| 2004/0152508 A1 | 8/2004 | Lind |
| 2004/0214622 A1 | 10/2004 | Atkinson |
| 2004/0224753 A1 | 11/2004 | Odonovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0137014 A1 | 6/2005 | Vetelaninen |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |

(56) References Cited

U.S. PATENT DOCUMENTS

| | | |
|---|---|---|
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0139306 A1* | 6/2008 | Lutnick ............... G06Q 30/02 463/30 |
| 2008/0146321 A1 | 6/2008 | Parente |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0252419 A1 | 10/2008 | Batchelor |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0263173 A1 | 10/2008 | Weber et al. |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders et al. |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0271287 A1 | 10/2009 | Halpern |
| 2009/0275410 A1 | 11/2009 | Kisenwether et al. |
| 2009/0275411 A1 | 11/2009 | Kisenwether et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0106612 A1 | 4/2010 | Gupta |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speers et al. |
| 2010/0227670 A1 | 9/2010 | Arezina et al. |
| 2010/0227671 A1 | 9/2010 | Laaroussi |
| 2010/0227687 A1 | 9/2010 | Speers et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0065492 A1 | 3/2011 | Acres |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1* | 7/2011 | Block ............... G06Q 30/02 463/1 |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0263318 A1 | 10/2011 | Agarwal et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |

(56) References Cited

U.S. PATENT DOCUMENTS

| | | | |
|---|---|---|---|
| 2012/0184362 A1 | 7/2012 | Barclay et al. | |
| 2012/0184363 A1 | 7/2012 | Barclay et al. | |
| 2012/0190426 A1 | 7/2012 | Acres | |
| 2012/0194448 A1 | 8/2012 | Rothkopf | |
| 2012/0208618 A1 | 8/2012 | Frerking | |
| 2012/0231885 A1 | 9/2012 | Speer, II | |
| 2012/0239566 A1 | 9/2012 | Everett | |
| 2012/0322563 A1 | 12/2012 | Nguyen et al. | |
| 2012/0330740 A1 | 12/2012 | Pennington et al. | |
| 2013/0005433 A1 | 1/2013 | Holch | |
| 2013/0005443 A1* | 1/2013 | Kosta | G07F 17/3206 463/25 |
| 2013/0005453 A1 | 1/2013 | Nguyen et al. | |
| 2013/0059650 A1 | 3/2013 | Sylla et al. | |
| 2013/0065668 A1 | 3/2013 | LeMay | |
| 2013/0281188 A1 | 3/2013 | Guinn | |
| 2013/0104193 A1 | 4/2013 | Gatto et al. | |
| 2013/0132745 A1 | 5/2013 | Schoening et al. | |
| 2013/0185559 A1 | 7/2013 | Morel | |
| 2013/0196756 A1 | 8/2013 | Nguyen | |
| 2013/0196776 A1 | 8/2013 | Nguyen | |
| 2013/0210513 A1 | 8/2013 | Nguyen | |
| 2013/0210514 A1 | 8/2013 | Nguyen | |
| 2013/0210530 A1 | 8/2013 | Nguyen | |
| 2013/0225279 A1 | 8/2013 | Patceg | |
| 2013/0225282 A1 | 8/2013 | Williams et al. | |
| 2013/0252730 A1 | 9/2013 | Joshi | |
| 2013/0316808 A1 | 11/2013 | Nelson | |
| 2013/0337889 A1* | 12/2013 | Gagner | G07F 17/3209 463/25 |
| 2014/0006129 A1 | 1/2014 | Heath | |
| 2014/0057716 A1 | 2/2014 | Massing et al. | |
| 2014/0087862 A1 | 3/2014 | Burke | |
| 2014/0094295 A1 | 4/2014 | Nguyen | |
| 2014/0094316 A1 | 4/2014 | Nguyen | |
| 2014/0100955 A1* | 4/2014 | Osotio | G06F 3/011 705/14.55 |
| 2014/0121005 A1 | 5/2014 | Nelson | |
| 2014/0179431 A1 | 6/2014 | Nguyen | |
| 2014/0274309 A1 | 9/2014 | Nguyen | |
| 2014/0274319 A1 | 9/2014 | Nguyen | |
| 2014/0274320 A1 | 9/2014 | Nguyen | |
| 2014/0274342 A1 | 9/2014 | Nguyen | |
| 2014/0274357 A1 | 9/2014 | Nguyen | |
| 2014/0274360 A1 | 9/2014 | Nguyen | |
| 2014/0274367 A1 | 9/2014 | Nguyen | |
| 2014/0274388 A1 | 9/2014 | Nguyen | |
| 2015/0089595 A1 | 3/2015 | Telles | |
| 2015/0133223 A1 | 5/2015 | Carter | |
| 2015/0143543 A1 | 8/2015 | Phegade | |
| 2017/0116819 A1 | 4/2017 | Nguyen | |
| 2017/0116823 A1 | 4/2017 | Nguyen | |
| 2017/0144071 A1 | 5/2017 | Nguyen | |
| 2017/0148259 A1 | 5/2017 | Nguyen | |
| 2017/0148261 A1 | 5/2017 | Nguyen | |
| 2017/0148263 A1 | 5/2017 | Nguyen | |
| 2017/0206734 A1 | 7/2017 | Nguyen | |
| 2017/0228979 A1 | 8/2017 | Nguyen | |
| 2017/0243440 A1 | 8/2017 | Nguyen | |
| 2017/0337770 A1 | 11/2017 | Nguyen | |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Finnegan, Amanda, "Casinos Connecting with Customers via Iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.

(56) References Cited

OTHER PUBLICATIONS

Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action fpr U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/843,087, dated Feb. 25, 2016.
Office Action for U.S. Appl. No. 13/801,234, dated Mar. 8, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, mailed Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Office Action for U.S. Appl. No. 13/296,182, dated Dec. 23, 2015.
Advisory Action for U.S. Appl. No. 13/843,192, dated May 8, 2014.
Office Action for U.S. Appl. No. 14/217,066, dated Dec. 22, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.

(56) References Cited

OTHER PUBLICATIONS

Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, maied Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, mailed Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/801,256, dated Aug. 18, 2017.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.

* cited by examiner

DETERMINATION OF ADVERTISEMENT BASED ON PLAYER PHYSIOLOGY

CROSS-REFERENCE TO OTHER APPLICATION

This application claim priority of U.S. Provisional Patent Application No. 61/789,332, filed Mar. 15, 2013, and entitled "DETERMINATION OF ADVERTISEMENT BASED ON PLAYER PHYSIOLOGY", which is hereby incorporated by reference herein.

BACKGROUND OF THE INVENTION

Gaming devices are ubiquitous in casinos and other gambling establishments. These devices, often in the form of slot machines, allow a user to place a wager on a game of chance and/or skill. Players of slot machines are captive audiences for the duration of the play session that could last hours.

However, gaming establishments are always looking for ways to captivate players to keep them at their establishment playing the gaming devices. Additionally, gaming establishments are always looking for ways to generate income. Advertisements (ads) from third party advertisers may be a way for the gaming establishment to generate additional income. However, unlike broadcast TV, radio, newspaper, and the Internet, there are no meaningful revenue generated by advertisements for the gaming establishments. Countless hours of legal and regulated video content are served up to the captive slot players each year for the 600 million trips that they make, but no meaningful advertisement revenue is realized.

Some attempts to insert advertisements on game devices have been made by replacing the reel symbols with pictures or logo's of products being advertised. However, it proved to be a failure as the games become confusing, and distracting to player. It also alienates players as there are no incentive for players to play on a heavily advertised gaming device when a nearby gaming device offers a pure entertainment experience without the distraction and delays associated with sponsored advertisements.

OVERVIEW

The present disclosure relates generally to advertisements. More particularly, the present disclosure relates generally to determining advertisements to be displayed on gaming machines. Even more particularly, the present disclosure relates generally to determining advertisements to be displayed on gaming machines based on a player's physical body movement, such as eye movement.

In one embodiment, a system of selective advertising comprises: a gaming server configured to: receive a request to play a game of chance from a gaming device; transmit gaming data to the gaming device, the gaming data associated with the requested game of chance; receive player data, the player data associated with the player's eye movement, gestures, or change in state; analyze the player data; determine a context associated with the player data; and initiate an action based on the determined context. The gaming device is configured to: receive the gaming data; display the gaming data on a display of the gaming device. A sensor proximate the gaming device may be configured to detect player data, the player data includes at least data based on player eye movement, gestures, or change in state.

In another embodiment, a method for selecting advertisements based on player physiology comprises transmitting, by a gaming device, a request to play a game of chance; receiving gaming data at the gaming device, the gaming data associated with the requested game of chance; determining, by a sensor, if there is player eye movement changes; determining, by the sensor, if there is player movement; recording the player eye movement changes if it is determined that there is player eye movement changes; and recording the player movement if it is determined that there is player movement.

In still another embodiment, a method for selecting advertisements comprises receiving, by a gaming server, a request to play a game of chance; transmitting gaming data to a gaming device, the gaming data associated with requested game of chance; receiving player data, the player data including at least player gesture movement, eye movement, or state change; analyzing the player data; determining at least one advertisement based upon the analyzed player data; transmitting the at least one advertisement to the gaming device; determining a context associated with the player data; and initiate an action based on the determined context.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Embodiments are described herein in the context of determination of advertisement based on player physiology. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
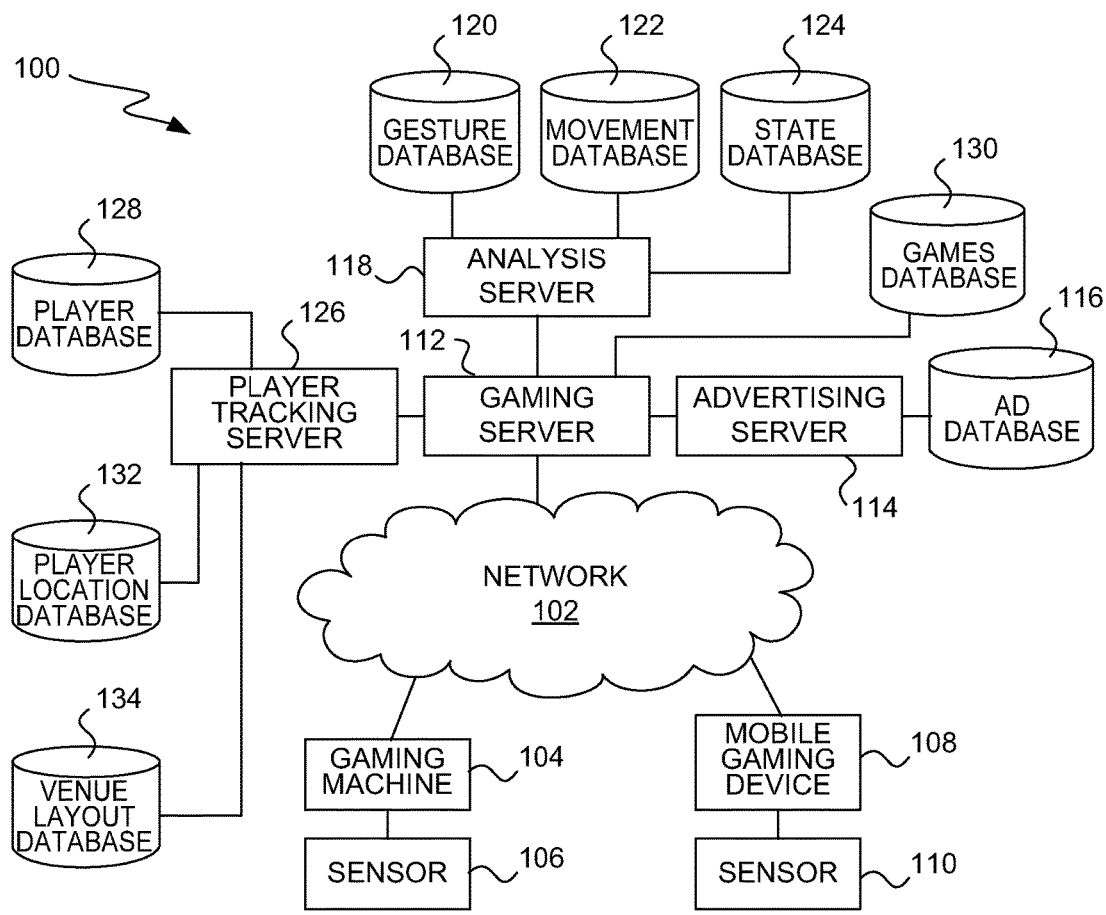
FIG. 1 illustrates an example gaming system.

FIG. 1 illustrates an example gaming system. The gaming system 100 includes a plurality of gaming devices. Gaming devices may be gaming machines 104 or mobile gaming devices 108. Mobile gaming devices 108 may be any portable device capable of playing games (e.g. games of chance, video games, and the like) such as, for example, portable telephones, laptops, computers, notebooks, tablets, media players, and the like. Although illustrated with one gaming machine 104 and one mobile gaming device 108, this is not intended to be limiting as there may be a plurality of gaming machines 104 and a plurality of mobile gaming devices 108. The gaming devices 104, 108 may be configured to communicate with a gaming server 112 via network 102. The gaming devices 104, 108 may communicate with gaming server 112 via any wired or wireless connection. Wireless connections may be any known wireless methods such as a 3G wireless technology, 4G wireless technology, Bluetooth, wireless universal serial bus, near-field magnetic communication, Fire Wire, WiMax, LTE, IEEE 802.11x technology, radio frequency, narrow-beam infrared (IR) sensor, RFID tag, vibration sensor or any other known wireless methods.

The gaming machine 104 may have a sensor 106 and mobile gaming device 108 may have a sensor 110. Although illustrated with one sensor 106, 110, this is not intended to be limiting as gaming machine 104 and mobile gaming device 108 may have a plurality of sensors to track different movements and states of the player. Sensors 106, 110 may be configured to determine or track movement, mental state, or physical state of the player. In one embodiment, sensors 106, 110 may be configured to determine or track the gaze or direction of a human eye. For example, if the player is playing a car racing game that has many billboards (e.g. billboards advertising food, liquor, electronics, entertainment, tournaments, and the like), the sensor 106, 110 may track where on the screen, and whether the player is looking at the billboards while driving the racing car. In another embodiment, the sensor may track whether the player is looking at an avatar associated with playing certain games of chance. In yet another embodiment, the sensor may determine that the player is looking at the spin button on gaming devices 104, 108.

The sensors 104, 108 may be any known sensors designed to determine or track the gaze of an eye, such as a camera. Additionally, any known eye tracking movement methods may be used to determine or track the gaze of the eye such as, for example, the method described in U.S. Pat. No. 7,986,816 entitled, "METHODS AND SYSTEMS FOR MULTIPLE FACTOR AUTHENTICATION USING GAZE TRACKING AND IRIS SCANNING". Once player eye movement is detected by the sensor 106, 108, the detected eye movement data and the location of the stare (e.g. pictures or images of the player's eye) may be transmitted to the gaming server 112, via network 102, for analysis.

In the same or another embodiment, sensors 106, 110 may be configured to determine or track gestures or facial expressions from the player. For example, if the player wins a bonus, the player may smile. If the player lost at a game of chance, the player may turn the smile into a frown. The sensors 104, 108 may be any known sensors designed to determine or detect gestures and facial expressions, such as a camera. A well-known gesture sensor is Microsoft's Kinect® 3D sensor. Additionally, any known gesture detection method may be used to determine or track human gestures. Once player gesture, facial expression, or movement is detected by the sensor 106, 108, the detected gesture data (e.g. pictures or images of the player's face, body, hands, and the like) may be transmitted to the gaming server 112, via network 102, for analysis.

In still the same or another embodiment, sensors 106, 110 may be configured to track the state of a player. States of a player may be any biological or physiological state, for example, body temperature, oxygen level, heart rate, skin color (e.g. facial), breathing rate, and any other biological or physiological state. For example, sensor 106, 110 may detect that a player has a lower than normal temperature, low oxygen level and a high heart rate. In another example, sensor 106, 110 may detect a higher than normal temperature reading and fast heart rate from the player. In one embodiment, sensors 106, 100 may be an infrared camera that continuously monitors a player's face for temperature changes in various areas and dynamically compare the changes to a preset baseline measurement to quantify the player's state changes. In another embodiment, sensor 106, 100 may be a camera that captures the player's facial expression in visible light and dynamically compare the variation to a baseline measurement to quantify the player's state change (emotional expression, in this case). Whenever an optical sensor, such as a camera, is being used, the analysis of state change can be done by comparing variations between successive video frames using known digital image processing methods such as pixel subtraction, genetic programming, and the like.

The sensors 104, 108 may be any known sensors designed to determine or detect biological or physiological changes in a player, such as, for example a temperature sensor, a conductivity/resistivity sensor, a PH level sensor, a salinity sensor, camera, and the like. In one embodiment, the physiological sensor may be positioned on the gaming machine in a location known to be in contact with the player, such as the "spin" button, "cash out" button, and the like. In another embodiment, the physiological sensor may be an IR camera configured to detect human temperature or a visible light spectrum camera to detect facial expressions. Additionally, any known biological or physiological change detection method may be used. Once a change in state of the player is detected by the sensor 106, 108, the detected state change data (e.g. thermal image of the player's face, heartbeat, detection of sweaty or clammy hands, facial expressions, and the like) may be transmitted to the gaming server 112, via network 102, for analysis.

Gaming server 112 may receive the eye movement data, gesture data, and/or change state data and analyze the data using analysis server 118. Analysis server 118 may have a gesture database 120, movement database 122, and state database 124. Each database 120, 122, and 124 may be configured to store associated data (e.g. gesture database 120 may store gesture data; movement database 122 may store eye movement data; state database 124 may store change state data, baselines and thresholds data) and at least one associated context. The associated context may be an extrapolation, determination, inference, or anticipation of what the player may desire, want, or feel.

EXAMPLE 1

Examples described herein for illustrative purposes only and not intended to be limiting. For example, although illustrated with a car racing game, any other non-gaming (e.g. video games) or games of chance may be played such as Keno, black jack, poker, and the like.

A player playing a car racing game may gaze to a billboard advertising beer. The sensor 106, 108 may detect this eye movement and transmit the eye movement data to the gaming machine server 112 for analysis using the analysis server 118. Analysis server 118 may analyze the eye movement data using movement database 122, player tracking database 128, games database 130, advertisement database 116, etc. Movement database 122 may have a table to map eye movements to at least one associated context. In this example, eye movements looking at beer may be associated with the context of having a desire to drink beer, a feeling of thirst, or being hot.

Simultaneously, before, or after detecting the eye movement, sensor 106, 110 may detect the player wiping sweat off his forehead. The sensor 106, 110 may also determine that the player does not remove his hands from the steering wheel (or any other input device, such as a joystick, trackball, and the like) often other than to wipe his forehead. This combination of detected gestures may be detected and transmitted to gaming server 112 for analysis by analysis server 118. Analysis server 118 may analyze the gesture movement using gesture database 120. Gesture database 120 may have a table to map gestures to at least one associated context. In this example, wiping sweat off a forehead may be associated with the context of being hot. Not moving his hands from the steering wheel often may be associated with the context of excitement and joy from playing the racing game and concentrating hard.

Simultaneously, before, or after detecting the eye movement and/or gesture, sensor 106, 110 may detect that the temperature of the player has decreased by five degrees, the player's hands are clammy, and his breathing and heart rate has increased. This change state data may be detected and transmitted to gaming server 112 for analysis by analysis server 118. Analysis server 118 may analyze the change state data using state database 124 in the context of the game database 130 and the player database 128, for instance. State database 124 may have a table to map different state changes to at least one associated context. In this example, an increase in temperature may be associated with the context of being hot, sick, or running a fever. The high breathing and heart rate may be associated with the context of being excited playing the game. The slow blinking of the eyelids may be associated with the context of being tired. The smiling facial expression may be associated with happiness.

Based on each associated context, individually or collectively, analysis server 118 may determine that the player is excited about playing the racing game because he has been at the game for 30 minutes, pushing for the pole position in the final 5 laps, and therefore hot. Thus, in one example, the gaming server may determine that gaming establishment personnel should provide the player with a beer or drink. In another example, the gaming server 112 may determine that the action to take is to lower the temperature in that part of the gaming establishment (e.g. turn on an air conditioner or fan near the location of the player). By lowering the temperature, the gaming establishment ensures that the player will remain and continue to play at the gaming machine 104, 106 rather than leave because it is too hot.

In still another example, analysis server 118 may determine that since the player is wiping sweat off his forehead, has decreased body temperature, has clammy hands, and his breathing and heart rate has increased, the player may be close to having a heart attack. Thus, gaming server 118 may then determine that the action to take is to notify the player to stop playing the game by displaying a recommended "Cease Play" message on a display of gaming machines 104, 108. Alternatively, the gaming machine 112 may slow the game down, or end the game play without player knowledge. Gaming server 118 may also notify or alert gaming establishment personnel of the potential health emergency.

Gaming server 112 may also be configured to help determine additional advertisements to display on a display of gaming devices 104, 108. Gaming server 112 may be configured to communicate with player tracking server 126. Player tracking server 126 may track any desired player information or preferences, such as, accumulated points, likes and dislikes, player's demographic, what games the player prefer or plays often, what tournaments the player likes to play, what drinks the player often or previously ordered, and the like. By comparing the analysis obtained from analysis server 118 and player preferences obtained from player tracking server 126, gaming server 112 may determine optimal and the type of advertisements to display on a display of the gaming devices 104, 108. For example, if analysis server 118 determined that the player is hot and thirsty and gaming server 112 obtains player information that the player likes to drink Budweiser® beer from player tracking server 126, gaming server 112 may inform gaming establishment personnel to provide the player with Budweiser® beer. Additionally, at a convenient time (e.g. between gaming session, when no input from the player is detected within a pre-defined period of time, and any other predetermined criteria or time) an advertisement for Budweiser® beer may pop-up on a display of the gaming device.

EXAMPLE 2

The player may be playing a poker game on his mobile gaming device 108 while sitting in the sports bar and drinking a glass of soda. While playing the poker game, sensor 110 may track the player's eyes gaze direction. When analyzed in the context of the player's location information from player location database 132 and the venue layout database 134, the player's gaze may be mapped to a screen in the sports bar displaying a football game. The eye movement data may be transmitted to gaming server 112. Sensor 110 may also determine that the player tilted his head while his hand, holding a glass, moved upward. Lastly, sensor 110 may further determine that the player suddenly stood up and his heart rate increased slightly. The gesture data and change state data may be transmitted to the gaming server 112. Player location database 132 may contain the location of where the player is within the venue or gaming establishment. Data in the player location database 132 may be updated periodically as desired, such as every 30 seconds, 1-20 minutes, 30 minutes, every hour, and the like. Venue layout database 134 may contain data about the layout of the venue such as the location of the pool, location of each gaming machine, location of restaurant and bars, and the location of any other desired area.

Gaming server may then transmit the received data to analysis server 118 for analysis. Analysis server 118 may compare the received eye movement data to data stored in movement database 122. Analysis server 118 may determine that, in the context of the player's current location, time, and gaze direction, eye movement to a display displaying a football game may be associated with the context of enjoying watching and/or playing football. Analysis server 118 may then compare the received gesture data to data stored in gesture database 120. Analysis server 118 may determine that movement of a tilted his head with hands moving upward while holding a glass may be associated with the context of finishing a drink. In other words, the player may have finished drinking his drink.

Analysis server 118 may then compare the received change state data to data stored in state database 124. Analysis server 118 may determine that movement of suddenly standing up and an increase in heart rate may be associated with a win from playing the game of chance.

Based on the analysis obtained from analysis server 118, gaming server 112 may determine that the player may need another drink and inform gaming establishment personnel to send another drink to the player. Advertising server 114 may also determine that advertisements associated with football and/or football related advertisements (e.g. beer, sports drink, athletic products, and the like) should be pushed to and displayed on a display of the mobile gaming device 108. In another embodiment, the advertisements may be any other type of advertisement for the gaming establishment such as advertisements in anticipation of upcoming events related to the gaming establishment and/or the game of chance being played on the gaming device (e.g. new game of chance themes, upcoming bonuses to be received, jackpot size, future poker tournaments, ability to double down in future hands of the current game session, and the like).

EXAMPLE 3

Gaming establishment may anticipate and/or determine the probability of eye movement (e.g. based on tests, statistics, probability, or any other method of probability or determination) to specific areas of the gaming devices 104, 108. For example, gaming establishment may determine that a person's gaze or eye movement is highest at lower right hand corner of the gaming device 104, 108 where the "Spin" button is located. Each area or zones of the gaming device 104, 108 may be assigned an advertisement pricing based on the probability of a player's eye gaze. For example, in areas with a higher probability of a player's gaze, the price for displaying or presenting the advertisement in that area may be high. In areas with a lower probability of a player's gaze, such as the bill collector, the price for displaying or presenting the advertisement on or proximate the bill collector may be low.

A player may begin playing a Wheel Of Fortune® game of chance on gaming device 104, 108. Sensor 106, 110 may detect the player's gaze at lower right hand corner of the gaming device 104, 108 where the "Spin" button is located at the start of the game and periodically during the gaming session. The eye movement data, lingering time, the game being played, current time, location of the player, profile of the player, and the like, may be transmitted to the advertising server 114, via gaming server 112, to determine what advertisement should be displayed on the gaming device 104, 108 and how much should be charged to the advertiser per ad impression.

Advertising server 114 may have an advertisement database 116 configured to store advertisement data received from third party advertisers. Stored advertisement data may include method of advertisement (e.g. whether the advertisement is an image, video, audio, or a combination of the above), fee for the advertisement, and when the advertisement should be transmitted to the gaming device 104, 108 based on the received eye movement data. For example, based upon the eye movement data received from sensor 106, 110, advertising server 114 may determine that an advertisement for Verizon® should be displayed on gaming device 104, 108.

Although gaming server 112, analysis server 118, player tracking server 126, and advertising server 114 are illustrated as separate servers, this is not intended to be limiting as they may be incorporated into one gaming server rather than separate servers.

Figure 2:
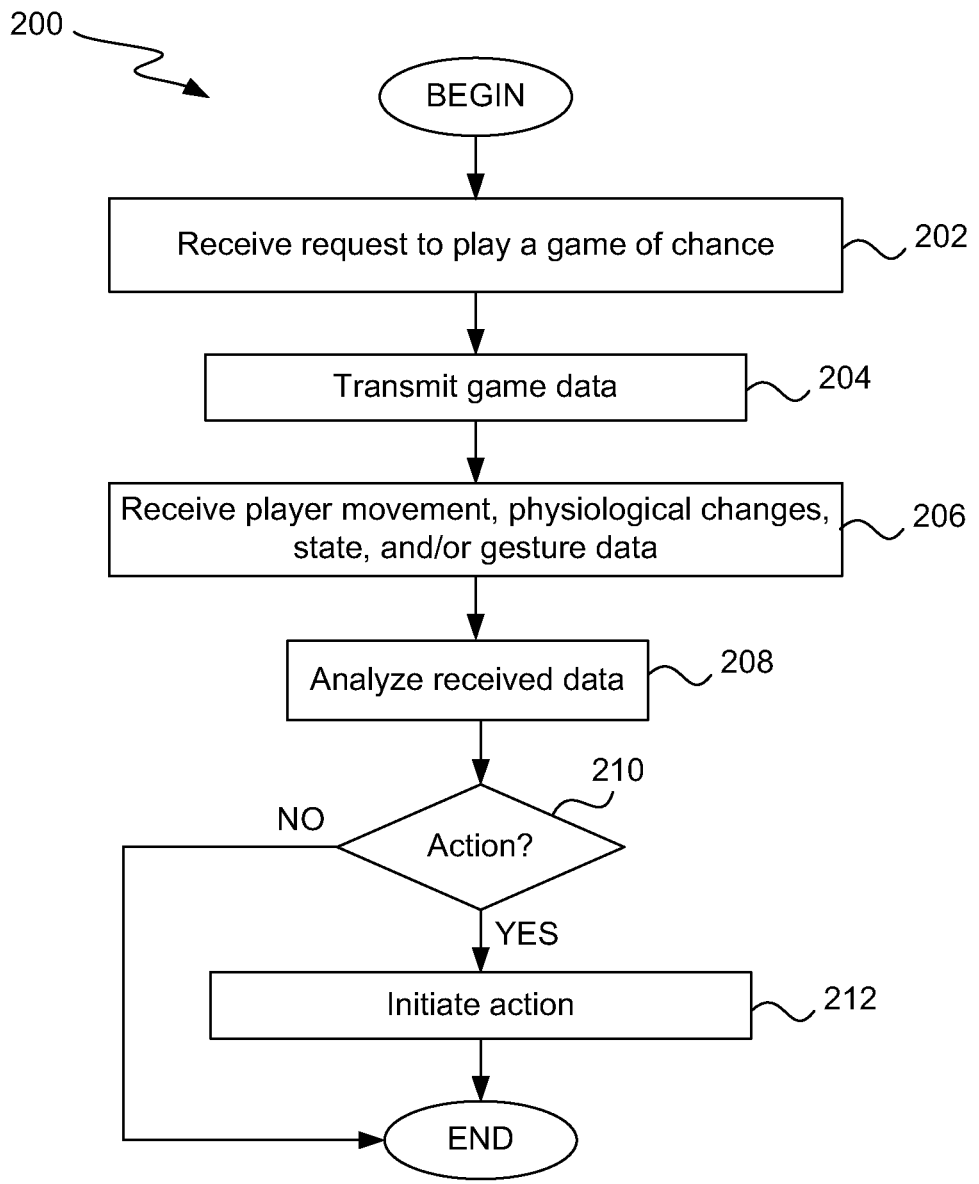
FIG. 2 illustrates an example method for determining advertisements to display on a gaming device.

FIG. 2 illustrates an example method for determining advertisements to display on a gaming device. Method 200 may begin with receiving a request to play a game of chance at 202 by a gaming server. The game of chance may be played on a gaming device, such as, gaming machines 104 or mobile gaming devices 108 illustrated in FIG. 1. Mobile gaming devices may be any portable device capable of playing games (e.g. games of chance, video games, and the like) such as, for example, portable telephones, laptops, computers, notebooks, tablets, media players, and the like. Although illustrated and described with a request to play a game of chance, it will know be known that this invention may apply to non-gaming games, such as video games.

The gaming devices may be configured to communicate with a gaming server via any wired or wireless connection. Wireless connections may be any known wireless methods such as a 3G wireless technology, 4G wireless technology, Bluetooth, wireless universal serial bus, near-field magnetic communication, Fire Wire, WiMax, IEEE 802.11x technology, radio frequency, narrow-beam infrared (IR) sensor, RFID tag, vibration sensor or any other known wireless methods.

The gaming server may transmit gaming data at 204 to initiate the game of chance on the gaming device. The gaming data may be associated with the game of chance requested. For example, if a game of black jack is requested, the gaming data may be associated with a black jack game.

The player's movement, state, location, activity, physiological changes, facial expressions, and/or gestures may be received at 206. The player's movement, state, and/or gestures may be recorded using any known sensor on the gaming device. For example, a camera may be used to track the gaze of the player's eyes, facial expression, or gestures. Any known biological and/or physiological sensor may be used to detect the state of the player such as a temperature sensor, an IR camera for temperature imaging, a camera to sense facial emotions, gestures, and the like. States of a player may be any biological or physiological state, for example, body temperature, oxygen level, heart rate, breathing rate, and any other biological or physiological state. In one embodiment, an infrared camera that continuously monitors a player's face for temperature changes in various areas and dynamically compare the changes to a preset baseline measurement to quantify the player's state changes. In another embodiment, a camera that captures the player's facial expression in visible light and dynamically compare the variation to a baseline measurement to quantify the player's state change (emotional expression, in this case). Whenever an optical sensor, such as a camera, is being used, the analysis of state change can be done by comparing variations between successive video frames using known digital image processing methods such as pixel subtraction, genetic programming, and the like.

The received eye movement, state, player location, venue characteristics, player's game activities, player's demographic, and gesture data may be analyzed at 208. Gaming server may have a database storing data related to eye movement, player state, and gesture movements. The received data may be compared with data stored in the database in order to match the received data with an associated context. The associated context may be an extrapolation, determination, or anticipation of what the player may desire, want, or feel. For example, gaming server may receive data indicating that the player's eye gazed to a picture of a beer and the player's state has increased in body temperature.

The gaming server may then determine whether any action should be taken at 210. If no action is determined to be taken at 210, method 200 may end. In one example, gaming server may determine and inform that gaming establishment personnel should provide the player with a beer or drink. In another example, the gaming server may determine that the action to take is to lower the temperature in that part of the gaming establishment (e.g. turn on an air conditioner or fan near the location of the player). By lowering the temperature, the gaming establishment ensures that the player will remain and continue to play at the gaming machine rather than leave because it is too hot. Thus, gaming server may initiate the action at 212. For example, gaming server may send a notification to the gaming establishment personnel to provide the player with a beer or drink.

Figure 3:
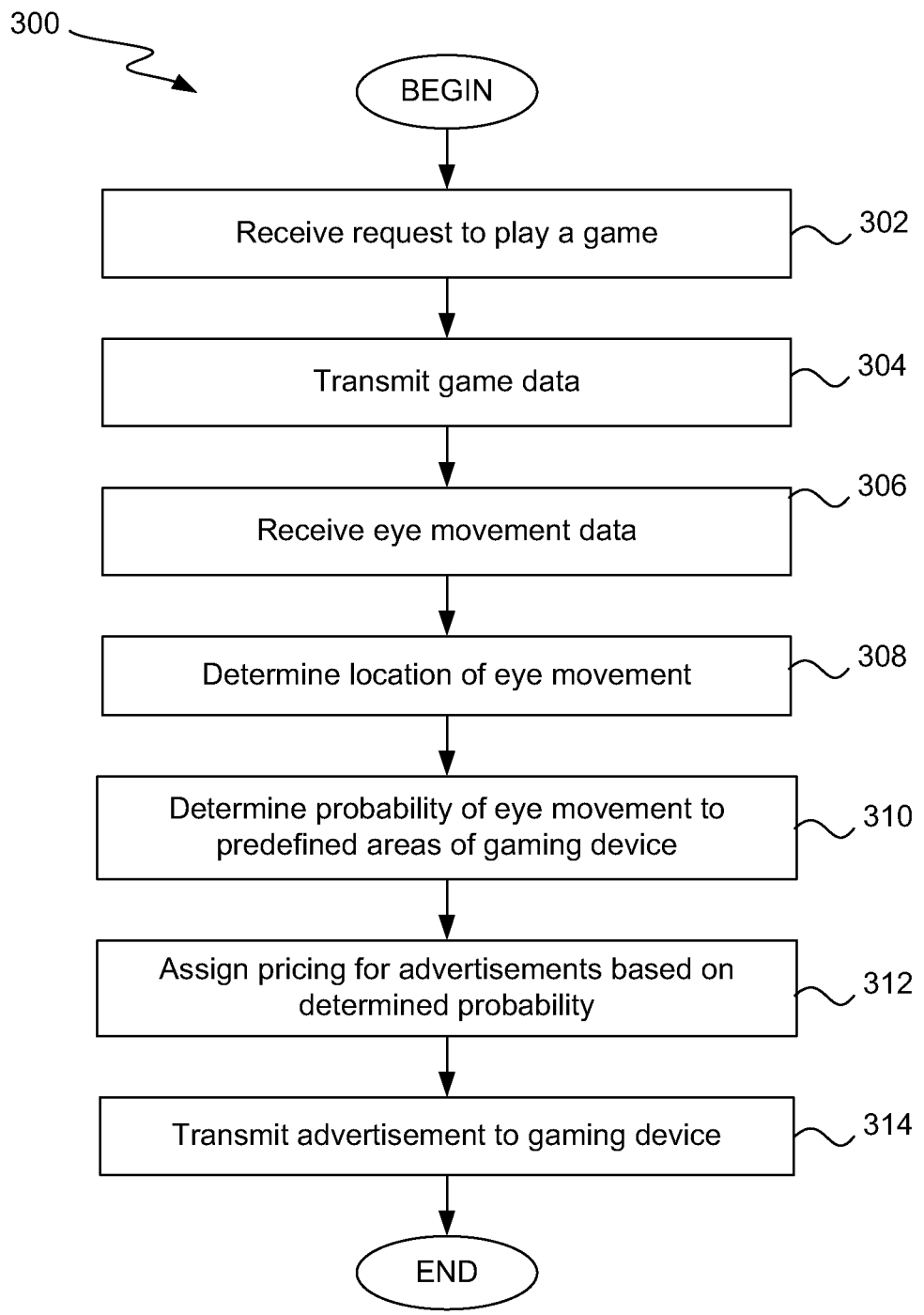
FIG. 3 illustrates another example method for determining advertisements to display on a gaming device.

FIG. 3 illustrates another example method for determining advertisements to display on a gaming device. Method 300 may begin with receiving a request to play a game at 302 by a gaming server. The game may be played on a gaming device, such as, gaming machines 104 or mobile gaming devices 108 illustrated in FIG. 1. Mobile gaming devices may be any portable device capable of playing games (e.g. games of chance, video games, and the like) such as, for example, portable telephones, laptops, computers, notebooks, tablets, media players, and the like. Although illustrated and described with a request to play a game of chance, it will know be known that this invention may apply to non-gaming games, such as video games.

The gaming devices may be configured to communicate with a gaming server via any wired or wireless connection. Wireless connections may be any known wireless methods such as a 3G wireless technology, 4G wireless technology, Bluetooth, wireless universal serial bus, near-field magnetic or communication sensor, Fire Wire, WiMax, IEEE 802.11x technology, radio frequency, narrow-beam infrared (IR) sensor, RFID tag, vibration sensor or any other known wireless methods.

The gaming server may transmit gaming data at 304 to initiate the game of chance on the gaming device. The gaming data may be associated with the game of chance requested. For example, if a game of black jack is requested, the gaming data may be associated with a black jack game.

The player's eye movement data may be received at 306. The player's eye movement may be tracked and/or determined using any known sensor on the gaming device. For example, a camera may be used to track the movement or gaze of the player's eyes. The location of the received eye movement data, gazing duration, screen location, gaze direction, and the like, may be determined at 308. In one embodiment, the location of the eye movement data may be determined relative to the gaming device. In other words, the gaming server may determine where, on the gaming machine, the player gazed at. In another embodiment, the location of the eye movement data may be determined relative to a screen or display at the bar within the gaming establishment.

Gaming establishment may anticipate and/or determine the probability of eye movement (e.g. based on tests, statistics, probability, or any other method of probability or determination) to specific areas of the gaming device. For example, gaming establishment may determine that a person's gaze or eye movement is highest at lower right hand corner of the gaming device where the "Spin" button is located. Each area of the gaming device may be assigned an advertisement pricing based on the probability of a player's eye gaze at 312. For example, in areas with a higher probability of a player's gaze, the price for the advertisement may be high. In areas with a lower probability of a player's gaze, such as the bill collector, the price for the advertisement may be low.

An advertisement may then be transmitted to gaming device at 314. Gaming server may determine, based on the fee paid by third party advertisers, highest bid received in an ad-placement auction, or any other criteria, what advertisements to display on the gaming device.

Figure 4:
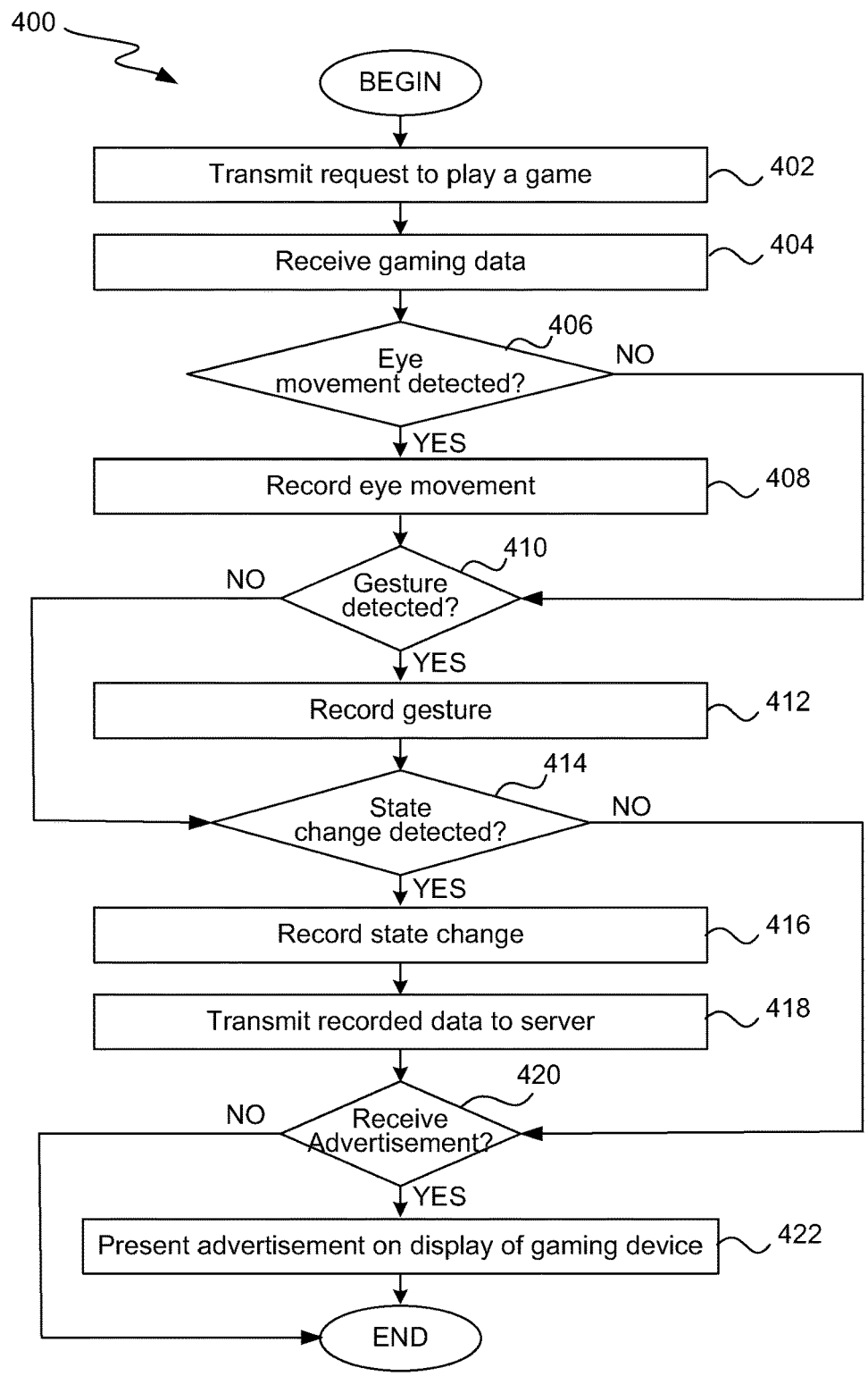
FIG. 4 illustrates yet another example method for determining advertisements to display on a gaming device.

FIG. 4 illustrates yet another example method for determining advertisements to display on a gaming device. Method 400 may begin with transmitting a request to play a game at 402 by a gaming device to a server, such as gaming server 112 illustrated in FIG. 1. Gaming device may be any computing device capable of playing games (e.g. games of chance, video games, and the like) such as, for example, portable telephones, laptops, computers, notebooks, tablets, media players, and the like.

Gaming data may be received at 404 in response to the request to play a game. The gaming data may cause the game to be initiated on the gaming device. For example, if the request was to play Keno, the gaming data may be associated with Keno and Keno games may then be initiated on the gaming device.

The gaming device may have at least one sensor to track different movements and states of the player. A determination may be made if eye movement of the player is detected at 406. If eye movement is detected at 406, the eye movement may be recorded at 408. For example, if the player is playing a car racing game that has many billboards (e.g. billboards advertising food, liquor, electronics, entertainment, tournaments, and the like), the sensor may track whether the player is looking at the billboards while driving the racing car. Still further, the sensor may determine which billboard the player is looking at if there is more than one displayed simultaneously. In another embodiment, the sensor may track whether the player is looking at an avatar associated with playing certain games of chance such as poker. In yet another embodiment, the sensor may determine that the player is looking at the spin button on the gaming device.

The sensor may be any known sensor designed to determine or track the gaze of an eye, such as a camera. Additionally, any known eye tracking movement methods may be used to determine or track the gaze of the eye.

If no eye movement is detected at 406, a determination may be made if player gesture is detected at 410. The gaming device may have at least one sensor configured to determine or track gestures from the player. If a player gesture is detected at 410, the player gesture may be recorded at 412. For example, if the player wins a bonus, the player may smile. If the player lost at a game of chance, the player may turn the smile into a frown. The sensor may be any known sensor designed to determine or detect gestures, such as a camera. Additionally, any known gesture or emotion detection method may be used to determine or track human gestures.

If no gesture or emotion is detected at 410, a determination may be made if a player's state change is detected at 414. States of a player may be any biological or physiological state, for example, body temperature, oxygen level, heart rate, breathing rate, facial expression, and any other biological or physiological state. If no state change is detected at 410, the method may continue at step 420 as further discussed below. However, if a state change is detected at 414, the state change may be recorded at 416. For example, sensor may detect that a player has a lower than normal temperature, low oxygen level and a high heart rate. In another example, sensor may detect a higher than normal temperature reading and fast heart rate from the player.

The sensors used may be any known sensor designed to determine or detect biological or physiological changes in a player, such as, for example a temperature sensor, PH level, conductivity, salinity, and the like. In one embodiment, the temperature sensor may be positioned on the gaming machine in a location known to be in contact with the player, such as the "spin" button, "cash out" button, and the like. In another embodiment, the temperature sensor may be an IR (infrared) camera configured to detect human temperature. Additionally, any known biological or physiological change detection method may be used. In one embodiment, an infrared camera that continuously monitors a player's face for temperature changes in various areas and dynamically compares the changes to a preset baseline measurement to quantify the player's state changes. In another embodiment, a camera that captures the player's facial expression in visible light and dynamically compare the variation to a baseline measurement to quantify the player's state change (e.g. emotional expression, in this case). Whenever an optical sensor, such as a camera, is being used, the analysis of state change can be done by comparing variations between successive video frames using known digital image processing methods such as pixel subtraction, genetic programming, and the like.

Those of ordinary skill in the art will know realize that above steps 408, 410, and 414 may be performed simultaneously or individually. The sensors may be used alone or in combination. Additionally, each sensor may be invoked at various times throughout game play. For example, if a player wipes sweat from his forehead, the state sensor may check to determine how tired the player is (e.g. check the player's heart rate, body temperature, and the like), and the gaming server may decide to slow down the game and introduce a refreshing beverage image on a billboard. The eye sensor may determine whether the player gazes at the billboard and send a notification to the gaming establishment to provide a drink to the player if it determines that the player looked at the billboard.

The recorded data (e.g. eye movement, gesture, and state change) may be transmitted to a server at 418. The server may be, for example, gaming server 112, or the advertisement server 114, illustrated in FIG. 1. A determination of whether an advertisement is received is made at 420. An advertisement associated with (or not associated with) the recorded data may be received at the gaming device. If no advertisement is received at 420, the method may end. However, if an advertisement is received at 420, the advertisement may be presented on a display of the gaming device at 422. For example, the server may determine that the player was gazing at an advertisement for beer, the advertisement may be for Budweiser® beer. In another embodiment, the advertisement may be priced based on the location or zone the beer advertisement was displayed as discussed in detail above in FIG. 3.

In one embodiment, recorded data may be stored on the gaming server for future and/or immediate analysis. For example, through game play, the gaming server may determine that the user felt excitement (e.g. detecting a smile, eyes become wider, heart rate increases, and the like), felt frustration (e.g. detecting a frown, rolling eyes, hands placed in a fist, hands banging on the gaming device or nearby object, player shouting some unhappy and/or curse words, and the like), and any other emotions or state of the player. Analysis of the player's state throughout game play may help the gaming establishment provide better customer service to its players, provide more customized advertisement to the players, help to determine products to provide to an establishment's customers, and the like.

For example, "frustration" state is recorded and can be correlated to when my "flappy bird" crashed into a post. Saving a game state at the time a player state is recorded is new and fertile ground for future development.

Figure 5:
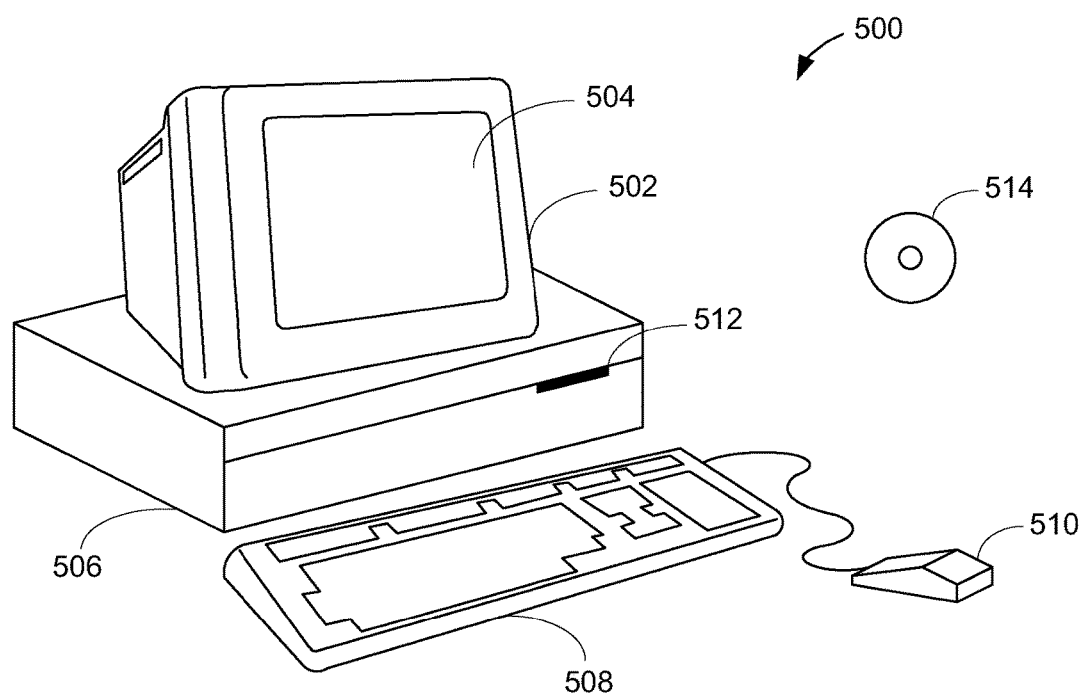
FIG. 5 illustrates an exemplary computer system.

FIG. 5 illustrates an exemplary computer system 500 suitable for use with at least one embodiment of the invention. The methods, processes and/or graphical user interfaces discussed above can be provided by a computer system. The computer system 500 includes a display monitor 502 having a single or multi-screen display 504 (or multiple displays), a cabinet 506, a keyboard 508, and a mouse 510. The mouse 510 is representative of one type of pointing device. The cabinet 506 houses a processing unit (or processor), system memory and a hard drive (not shown). The cabinet 506 also houses a drive 512, such as a DVD, CD-ROM or floppy drive. The drive 512 can also be a removable hard drive, a Flash or EEPROM device, etc. Regardless, the drive 512 may be utilized to store and retrieve software programs incorporating computer code that implements some or all aspects of the invention, data for use with the invention, and the like. Although CD-ROM 514 is shown as an exemplary computer readable storage medium, other computer readable storage media including floppy disk, tape, Flash or EEPROM memory, memory card, system memory, and hard drive may be utilized. In one implementation, a software program for the computer system 500 is provided in the system memory, the hard drive, the drive 512, the CD-ROM 514 or other computer readable storage medium and serves to incorporate the computer code that implements some or all aspects of the invention.

Figure 6:
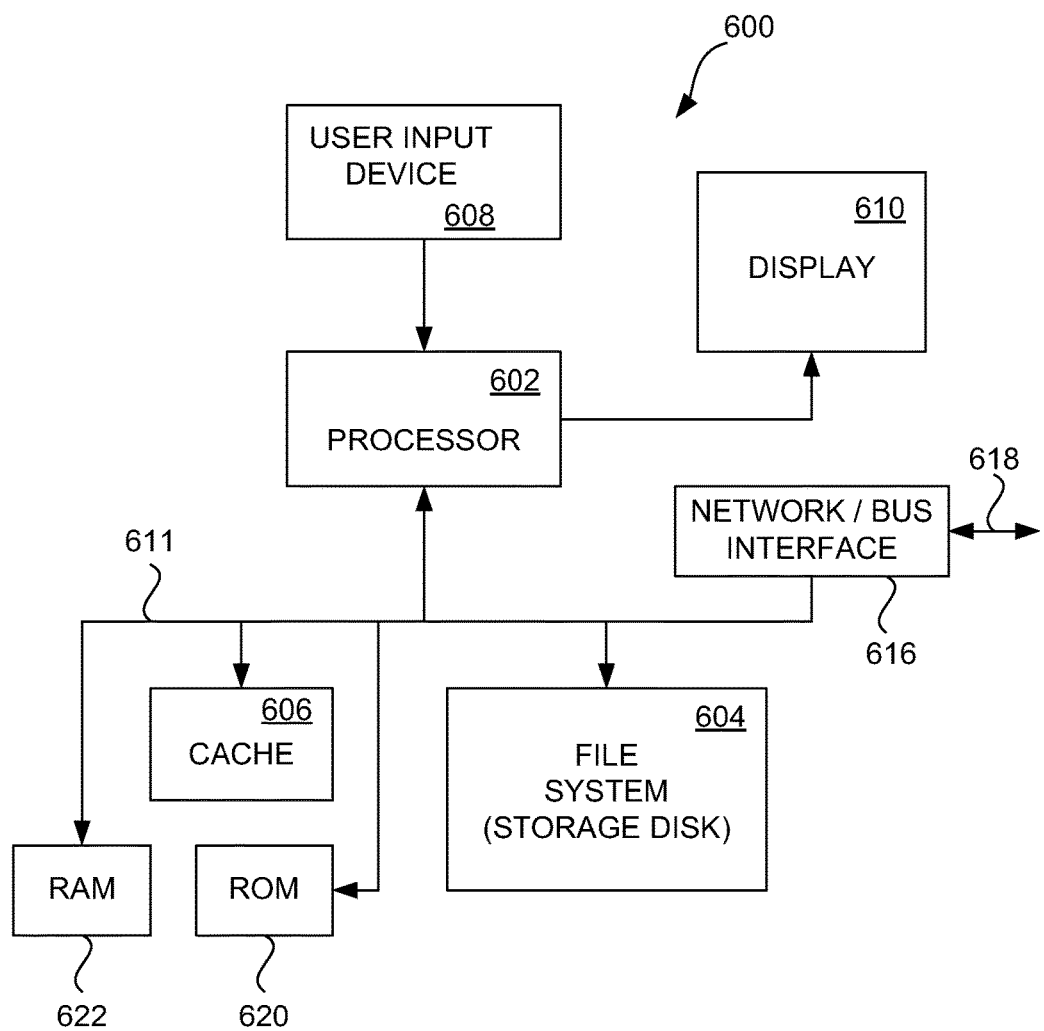
FIG. 6 is a block diagram of an example computing system.

FIG. 6 is a block diagram of an example computing system. The computing system 600 may be the gaming server 112, gaming machine 104, mobile gaming device 108, analysis server 118, player tracking server 126, advertising server 114 illustrated in FIG. 1, or any other server or computing device used to carry out the various embodiments disclosed herein. The computing system 600 may include a processor 602 that pertains to a microprocessor or controller for controlling the overall operation of the computing system 600. The computing system 600 may store any type of data and information as discussed above in a file system 604 and a cache 606. The file system 604 is, typically, a storage disk or a plurality of disks. The file system 604 typically provides high capacity storage capability for the computing system 600. However, since the access time to the file system 604 is relatively slow, the computing system 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The computing system 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The computing system 600 also includes a user input device 608 that allows a user of the computing system 600 to interact with the computing system 600. For example, the user input device 608 can take a variety of forms, such as a button, keypad, dial, and the like. Still further, the computing system 600 includes a display 610 (screen display) that can be controlled by the processor 602 to display information, such as a list of upcoming appointments, to the user. A data bus 611 can facilitate data transfer between at least the file system 604, the cache 606, the processor 602, and the CODEC 612.

In one embodiment, the computing system 600 serves to store a plurality of player tracking and/or third party advertiser data in the file system 604. When a user desires to have the computing system display a particular advertisement, a list of the various third party advertisers may be displayed on the display 610.

The computing system 600 may also include a network/bus interface 616 that couples to a data link 618. The data link 618 allows the computing system 600 to couple to a host computer or data network, such as the Internet. The data link 618 can be provided over a wired connection or a wireless connection. In the case of a wireless connection, the network/bus interface 616 can include a wireless transceiver.

While embodiments and applications of this invention have been shown and described, it would be apparent to those skilled in the art having the benefit of this disclosure that many more modifications than mentioned above are possible without departing from the inventive concepts herein.

What is claimed is:

1. A system of selective advertising, comprising:
    a gaming server configured to:
        receive a request to play a game of chance from a gaming device configured to receive a wager to play the game of chance;
        transmit gaming data to the gaming device, the gaming data associated with the requested game of chance;
        receive player data, the player data associated with an eye movement of the player, at least one gesture of the player, or at least one change in state of the player;
        analyze the player data;
        determine a context associated with the player data;
        determine an action to take based on the determined context associated with the player data;
        transmit a notification to a gaming establishment associated with the gaming device, the notification to the gaming establishment including at least the determined action to take;
        determine at least one non-gaming advertisement associated with the context; and
        transmit the at least one non-gaming advertisement to the gaming device for display on a display of the gaming device;
    the gaming device configured to:
        receive the gaming data; and
        display the gaming data on a display of the gaming device;
        display the at least one non-gaming advertisement on a portion the display; and
    a sensor proximate the gaming device, the sensor configured to detect player data, the player data includes at least data based on the eye movement of the player, the at least one gesture of the player, or the at least one change in state of the player.

2. The system of claim 1, wherein the determined action is a player recommended action, and
    wherein the player recommended action is displayed on a portion of the display of the gaming device.

3. The system of claim 1, further comprising:
    determine a location on the gaming device associated with the eye movement of the player;
    determine at least one advertisement associated with the determined location; and
    transmit the at least one advertisement to the gaming device for display on the display of the gaming device.

4. The system of claim 1, wherein the transmit the at least one at non-gaming advertisement further comprises:
    determine a location to display the at least one non-gaming advertisement; and
    assign an advertisement price for the displayed at least one non-gaming advertisement based on the displayed location.

5. The system of claim 3, wherein the transmit the at least one advertisement further comprises:
    determine a location to display the advertisement; and
    assign an advertisement price for the advertisement based on the determined location to display the advertisement.

6. The system of claim 1, wherein the determined action to take is associated with a service provided at the gaming establishment.

7. The system of claim 1, wherein the at least one change in state of the player includes biological or physical state changes.

8. A method for selecting advertisements based on player physiology, comprising:
    transmitting, by a gaming device configured to receive a wager, a request to play a game of chance;
    receiving gaming data at the gaming device, the gaming data associated with the requested game of chance;
    determining, by a sensor, if there is player eye movement changes from a first position to a second location;
    determining, by the sensor, if there is player movement;
    recording the player eye movement changes from the first position to the second location if it is determined that there is player eye movement changes;
    recording the player movement if it is determined that there is player movement;
    transmitting the recorded player eye movement changes and the recorded player movements to a server; and
    receiving a non-gaming advertisement for display on a display of the gaming device, the received non-gaming advertisement based on at least the recorded player eye movement changes to the second location.

9. The method of claim 8, wherein the received non-gaming advertisement for display on the display of the gaming device is based on at least the recorded player movement.

10. The method of claim 9, further comprising:
   determine a location to display the non-gaming advertisement on the display of the gaming device; and
   assign an advertisement price for the non-gaming advertisement based on the determined location to display the non-gaming advertisement.

11. The method of claim 8, wherein the sensor is positioned proximate to or on the gaming device.

12. The method of claim 8, further comprising determining if there is a change in a physiology of the player; and
   transmitting the change in the physiology of the player to the server if it is determined that there is a change in the physiology of the player.

13. The method of claim 12, further comprising receiving an advertisement for display on the display of the gaming device, the received advertisement associated with the change in the physiology of the player.

14. A method for selecting advertisements, comprising:
   receiving, by a gaming server, a request to play a game of chance from a gaming device configured to receive a wager;
   transmitting gaming data to a gaming device, the gaming data associated with the requested game of chance;
   receiving player data, the player data including at least a gesture of the player, an eye movement of the player, or a state change of the player;
   analyzing the player data;
   determining at least one non-gaming advertisement based upon the analyzed player data;
   transmitting the at least one non-gaming advertisement to the gaming device;
   determining a context associated with the player data;
   determine an action to take based on the determined context associated with the player data; and
   transmit a notification to a gaming establishment associated with the gaming device, the notification to the gaming establishment including at least the determined action to take.

15. The method of claim 14, wherein the action based on the determined context includes at least transmitting the notification for display on a display of the gaming device.

16. The method of claim 14, wherein the transmitting the at least one non-gaming advertisement further comprises:
   determining a location on a display of the gaming device to present the at least one non-gaming advertisement; and
   assigning an ad price based on the display location of the at least one non-gaming advertisement.

17. The method of claim 16, wherein the determining the location on the display of the gaming device further comprises analyzing a probability of the eye movement of the player on the display of the gaming device to determine the location to present the at least one advertisement.

18. The method of claim 14, further comprising determining at least one player interest based upon player tracking data, wherein the at least one non-gaming advertisement is based on the at least one player interest.

19. The method of claim 14, wherein the gaming device is a portable gaming device.

20. The method of claim 14, wherein analyzing the player data further comprises:
   storing the player data for analysis at a later date.

* * * * *